United States Patent [19]
Zeng

[11] Patent Number: 5,535,859
[45] Date of Patent: Jul. 16, 1996

[54] NOISE ATTENUATED BRAKE FRICTION MEMBER

[75] Inventor: Li J. Zeng, Ann Arbor, Mich.

[73] Assignee: AlliedSignal Inc., Morristown, N.J.

[21] Appl. No.: 511,571

[22] Filed: Aug. 4, 1995

[51] Int. Cl.$^6$ .................................................. F16D 65/02
[52] U.S. Cl. ................................. 188/250 B; 188/73.1
[58] Field of Search ............................. 188/73.1, 73.36, 188/73.37, 250 A, 250 B, 250 E, 250 G, 259, 77 W

[56] References Cited

U.S. PATENT DOCUMENTS

| | | | |
|---|---|---|---|
| 3,545,574 | 12/1970 | Cochrane | 188/250 B |
| 4,003,451 | 1/1977 | Torok | 188/250 E |
| 4,220,223 | 9/1980 | Rinker et al. | 188/73.1 |
| 4,705,146 | 11/1987 | Tarter | 188/73.1 |
| 5,456,339 | 10/1995 | Zeng | 188/250 E |

FOREIGN PATENT DOCUMENTS

| | | | |
|---|---|---|---|
| 2482687 | 11/1981 | France | 188/73.1 |
| 9113268 | 9/1991 | Germany | 188/250 B |

*Primary Examiner*—Robert J. Oberleitner
*Assistant Examiner*—Chris Schwartz
*Attorney, Agent, or Firm*—Leo H. McCormick, Jr.

[57] ABSTRACT

A friction material for a brake pad is disclosed which is used in a brake system to attenuate noise generated during a brake application. The friction material has double chamfers on its leading and trailing edges which extend from an engaging surface. Each of the double chamfers has a first surface area located in a first plane and a second surface area located in a second plane with respect to the engaging surface. The first surface area and the second surface area intersect to define an engagement contact edge where the friction material initially engages a rotating member such that path through which frequencies generated during a brake application are changed resulting in an acceptable noise level during a brake application.

10 Claims, 4 Drawing Sheets

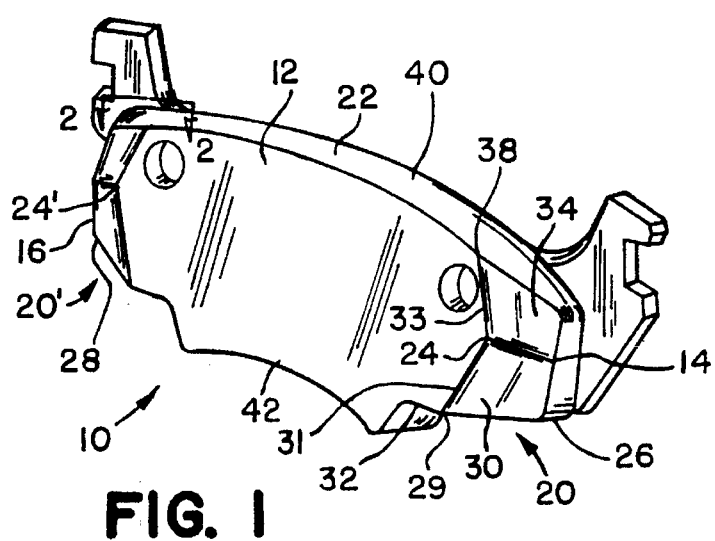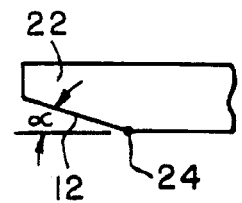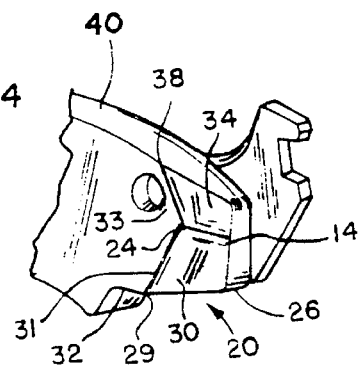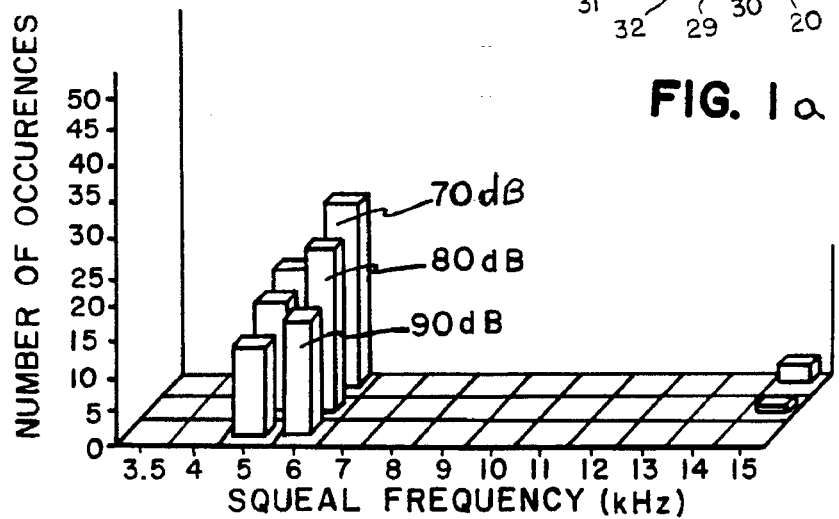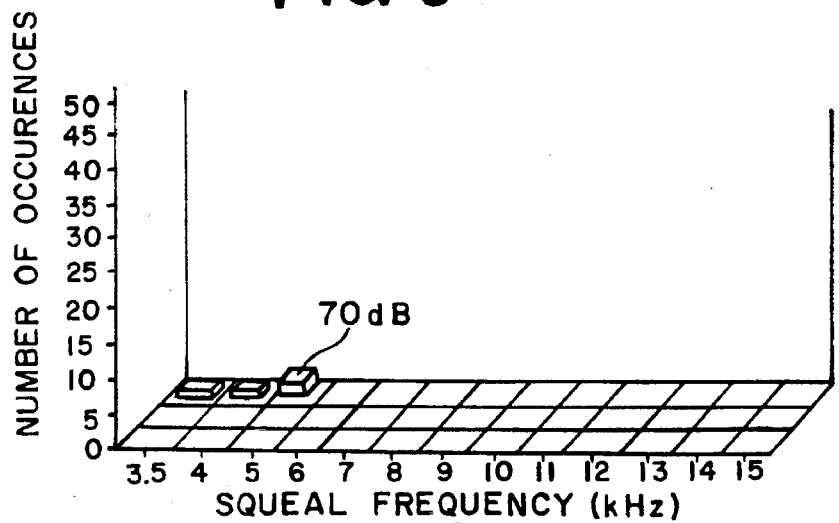

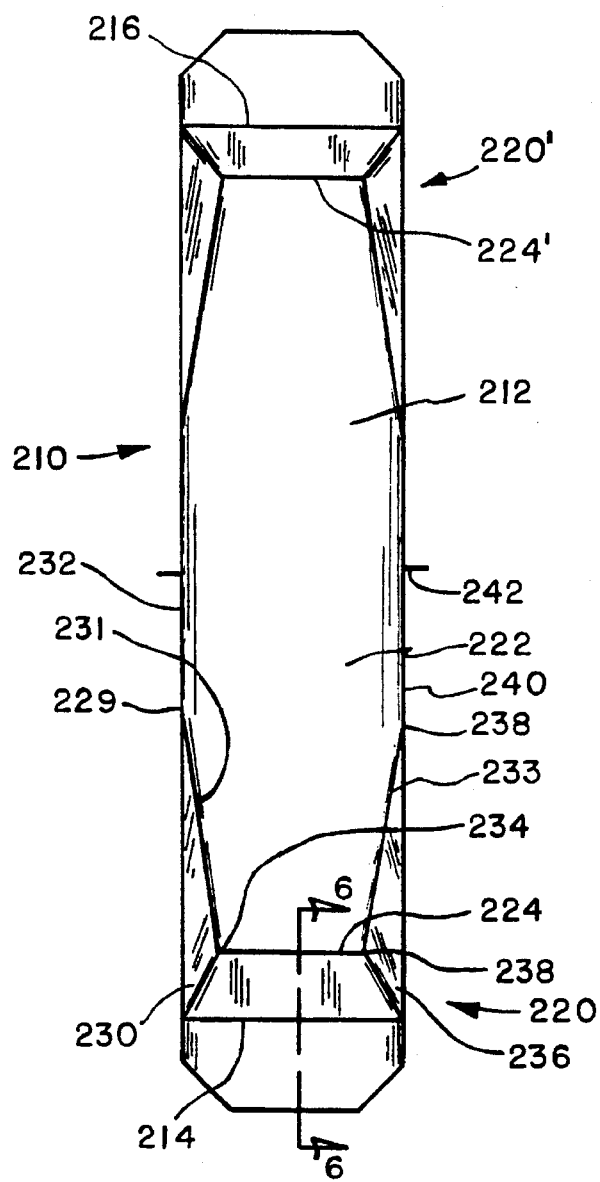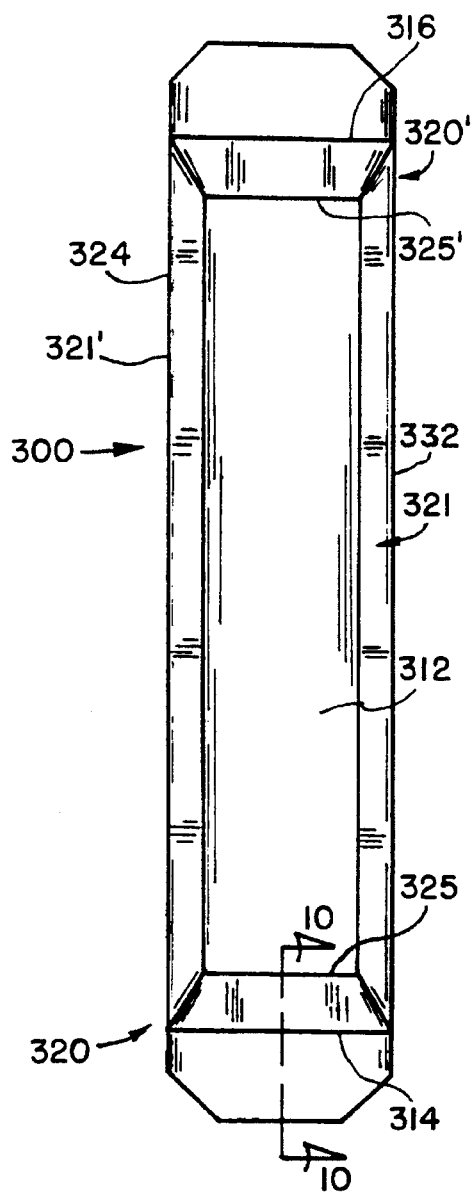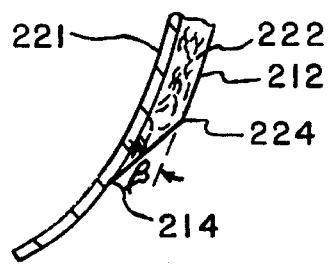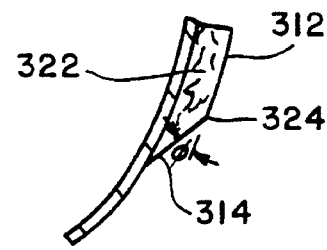

NOISE ATTENUATED BRAKE FRICTION MEMBER

This invention relates to a method of reducing noise generated during a brake application by developing an engagement surface for a friction pad wherein that a leading edge always initially engages a rotating member at a contact surface formed through at an intersecting point of double chamfers and the engagement surface to eliminate or reduce the development of natural frequencies which produce audible sounds during a brake application.

BACKGROUND OF THE INVENTION

Attempts have been made to reduce or mask noise generated during a brake application through the application of sound coating on backing plates as disclosed in U.S. Pat. No. 3,998,301, the location of a screen member between the friction member and backing plate as disclosed in U.S. Pat. No. 4,154,322, the use of discrete friction members as disclosed in U.S. Pat. No. 4,315,563, selecting the shape of a friction pad whose engagement surface is less than the nodal diameter of a frequency that would create undesirable noise as disclosed in U.S. Pat. No. 4,705,146 and through modification of ingredients in the friction material. U.S. Pat. No. 5,456,339 discloses the use of modal analysis to identify points most sensitive to vibration and a method of reducing noise through the removal of selected portions of a brake friction pad to modify such sensitivity. While most of the methods and structure in the prior art to reduce noise will perform in an adequate manner most have not been widely accepted by the automobile industry primarily because of the added cost associate for such brake systems.

It is known that most structures vibrate and such vibration is often the result of dynamic forces applied to such structures. The vibration of the structures in frequency domain is a product of the structure response spectrum and the spectrum of the applied dynamic force, U.S. patent application Ser. No. 08/399,062 discloses a method of manufacturing a friction pad wherein a clamping force is varied to change the communication of frequency between members to attenuate noise during a brake application. U.S. Pat. No. 4,220,223 discloses a friction pad having a uniform chamfer along the leading and trailing edges of a friction pad to modify a dynamic force that can be introduced into a brake system on engagement of a friction pad with a caliper. While this structure may reduce dynamic loads under certain applications high frequency noise was observed during dynamometer test evaluation of a brake system which included a caliper, associated brake linings and a rotor. Modal analysis and/or frequency response analysis of such a brake system could be performed to determine the natural frequencies generated during a brake application and thereafter modify the structure in accordance with the teaching in the prior art to reduce noise however most customers do not want to incur any additional cost associated with such analysis.

SUMMARY OF THE INVENTIONS

In an effort to reduce or eliminate noise developed during a brake application this invention essentially retains the same physical structure for a friction member as now accepted by customers. In such a friction member an engagement surface has a uniform taper such that dynamic loads are gradually introduced into a brake friction pad to provide for substantially uniform wear. From experimentation, it was determined that a single point of engagement such as achieved by double chamfer located on an initial contact edge of engagement will provide a quiet friction pad for a brake system throughout the life of a friction lining. The contact edge or point of engagement for a disc pad and drum pad is located along an arcuate surface and in a line which continually changes as a result of wear. The chamfers for a disc pad are located in planes which deviates from the engagement surface at an angle of from 10°–20° with 15° being a preferred angle while the chamfers for a drum pad are located in planes which have an angle of from 10°–30° with 20° being a preferred angle. With a disc pad the first chamfer begins along an inner peripheral edge at a point such that the first chamfer intersects the second chamfer at the point of engagement an equal distance from the inner peripheral surface and the leading edge while the second chamfer begins at a point along the outer peripheral edge and extends to the point of engagement. For a drum pad the point at which the chamfers begin could be the same for ease in manufacturing but differ for optimum reduction in the attenuation of noise. In a preferred embodiment for the disc pad, the area of the first and second chamfers will vary from being equal to an area differential where the second chamfer is about one-half the size of the first chamfer. From various tests it was determined that quite friction pads could be produced in quantities simply by grinding the first and second chamfers in a friction pad after curing or by shearing the surfaces from a friction pad prior to curing. The leading edge engagement with another member or rotor changes the path through which frequencies are communicated between the brake pad and rotating member such that objectionable sounds are either masked or not produced.

It is an object of this invention to provide a method of attenuating the development of audible frequencies generated during a brake application wherein a chamfered contact surface initiates the engagement of a leading edge and trailing edge such that noise is reduced during a brake application.

It is a further object of this invention to provide a method of manufacturing a friction pad wherein a leading edge and trailing edge has a double chamfer such that a reduced width contact edge forms the initial engagement with a rotating member.

These objects should be apparent from reading this specification while viewing the drawings.

BRIEF DESCRIPTION OF THE DRAWINGS

FIG. 1 is a schematic illustration of a friction pad for use in a disc brake which has been modified according to the present invention to reduce the generation of audible frequencies during a brake application;

FIG. 1a is a schematic of a portion of a friction pad for use in a disc brake of FIG. 1 having chamfers having dissimilar surface areas;

FIG. 2 is a sectional view taken along line 2—2 illustrating the chamfer deviation from the engagement surface of a friction pad;

FIG. 3 is a table illustrating base line noise development with a standard friction pad in a disc brake;

FIG. 4 is a table illustrating noise development of a friction pad of the present invention in a disc brake;

FIG. 5 is a schematic illustration of a friction pad for use in a drum brake which has been modified according to the principals of the present invention;

FIG. 6 is a view taken along line 6—6 of FIG. 5;

FIG. 9 is a schematic illustration of another friction pad for use in a drum brake which has been modified according to the principals of this present invention;

FIG. 10 is a view taken along line 10—10 of FIG. 9;.

DETAILED DESCRIPTION OF THE INVENTION

Figure 7:
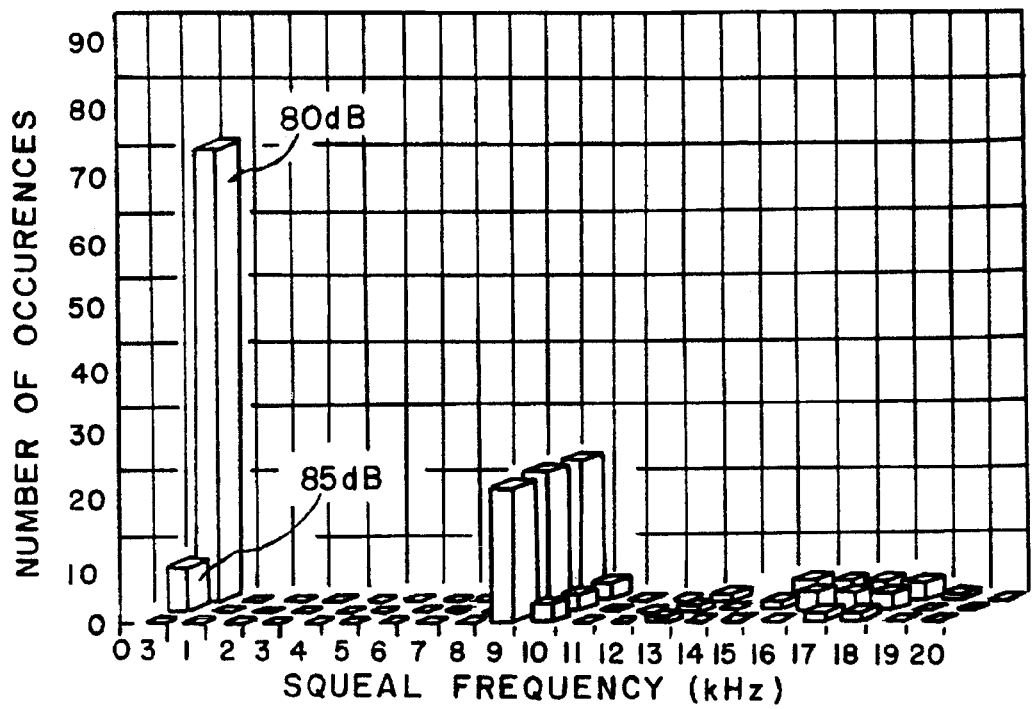
FIG. 7 is a table illustrating base line noise development through the engagement of a standard friction pad with a drum brake.

FIG. 1 illustrates a friction pad 10 for use in a disc brake system wherein the engagement surface 12 of the friction material 22 has been modified by double chamfers 20,20' located on both the leading 14 and trailing 16 edges of the friction material 22. A point contact 24,24' defined by the intersection plane of the double chamfers 20,20' and engagement surface 12 to define an initial point of engagement for surface 12 with a rotor in a brake system such that frequency vibrations are modified or attenuated.

During the manufacture of the friction material 22 the double chamfers 20,20' are either placed on ends 26 and 28 by being molded therein or shearing prior to curing or after curing through a grinding process. For most applications the double chamfers 20,20' will be created through a grinding process since the friction material 22 may have more than one application.

The double chamfers 20,20' deviate from the engagement surface 12 at a downward angle α of from 10°–20° with 15° being a preferred angle, see FIG. 2. Double chamfers 20 and 20' are identical and located on the opposite ends of friction material 22, however under certain applications it is understood that each chamfer may differ in both size and the downward angle. Only chamfer 20 is hereinafter described in detail. Double chamfer 20 has a first surface 30 that extends along a plane from a point 29 on the inner peripheral edge 32 along a line 31 until it intersects a second surface 34 at point 24. Point 24, in this preferred application, is located at an equal distance from the inner peripheral edge 32 and the leading edge 14 while the second surface 34 extends in a plane along a line 33 beginning at a point 38 on the outer peripheral edge 40 to point 24. Point 29 on the inner peripheral edge 32 is selected to be about half-way from a mid-point or center plane 42 of the friction material and edge 36 while point 38 is selected to be about two-thirds the distance from mid-point or center plane 42. The area of the first surface 30 and second surface 34 can vary in size from being equal with each other, as shown in FIG. 1, to an area differential where the second surface 34 is about one-half the size of the first surface 30 as shown in FIG. 1a. It will be appreciated the point contact 24 continues to change as a result of wear but will always be the initial engagement point on the leading edge 14.

In order to substantiate the attenuation of noise through the use of double chamfers 20,20' on a friction material 22, various tests were performed to measure noise created during a brake application of a base line friction material. A base line friction material was placed in a dynamometer to simulate performance in a brake system. And, audible frequencies noise created during a brake application was measured, recorded and retained.

An acceptable noise test for disc brakes in a dynamometer includes an performance evaluation of a friction material resulting from a series of stops from a set speed at a fixed deceleration rate and temperature. The following specific simulated brake applications were performed: Burnish stops (200 stops all from 40 mph at 10 ft/sec$^2$ and 200° F.); First Noise Evaluation Matrix stops (156 total stops all from 25 mph with 39 stops at 75 psi, 39 stops at 150 psi, 39 stops at 300 psi and 39 stops at 400 psi, and temperature variances of 50° F. from 150° F. to 450° F., respectively); First city traffic simulation stops (50 snubs(quick brake applications) 30–15 Mph at 6 ft/sec$^2$ at 250° F.; 50 snubs 30–15 mph at 6 ft/sec$^2$ at 350° F.; 20 snubs 30–15 Mph at 6 ft/sec$^2$ at 500° F.;.25 stops 40–1 Mph at 6 ft/sec$^2$ at 550° F.; 25 stops 40–1 Mph at 6 ft/sec at 500° F.; and 50 stops 40–1 Mph at 6 ft/sec at 350° F.); Second Noise Evaluation Matrix stops (Repeat to same sequence of the First Noise Evaluation Matrix); Second city traffic simulation stops (Repeat the sequence of the First city traffic simulation); and Third Noise Evaluation Matrix (Repeat the same sequence of the First Noise Evaluation Matrix).

The amplitude for noise was measured, recorded and stored in a computer during each brake application in this particular test sequence for the base line friction material. From an analysis and evaluation of the stored noise, it was determined that as long as the sound level is below 85 dB during any one stop in the series of stops, noise is not considered to be a problem. FIG. 3 is a block diagram of the test results for the base line.

Thereafter friction pad 10 with the double chamfers 20,20' was subjected to the same noise testing and evaluation as the base line friction material. FIG. 4 is a block diagram of the test results of friction pad 10. As can be seen objectionable noise has been substantially eliminated for this brake system.

FIG. 5 illustrates a friction pad 210 for use in a drum brake system wherein the engagement surface 212 of a friction material 222 has been modified by double chamfers 220,220' located on both the leading 214 and trailing 216 edges of the friction material 222. A contact edge 224,224' defined by the intersection of lines 231 and 233 on surface 212 with the double chamfers 220,220' provide for initial engagement of surface 212 with a drum in a brake system such that frequency vibrations are modified or attenuated the an acceptable level.

The double chamfers 220,220' deviate from contact edges 224, 224' on the engagement surface 212 at a downward angle β, as shown in FIG. 6, of from 10°–30° with 20° being a preferred angle. Double chamfers 220 and 220' are identical for this application and located on the opposite ends of friction material 222, however under certain applications it is understood that each chamfer may differ in both size and the downward angle. As disclosed herein for description purposed only chamfer 220 is hereinafter described in detail.

Double chamfer 220 has a first surface 230 that extends along a plane from a point 229 on a first peripheral edge 232 along a line 231 until it intersects point 234 of contact edge 224. Contact edge 224, in this preferred application, is located at a distance of about three-fourth the distance from point 229 to a point where the leading edge 214 engages the backing plate 221 while the second surface 236 extends in a plane along a line 233 beginning at a point 238 on peripheral edge 240 until it intersects contact edge 224. Point 229 on the first peripheral edge 232 and point 238 on the second peripheral edge 240 are selected to be from about one-third to one-half the distance from a mid-point or center 242 of the friction material 222 to the leading edge 214.

As shown in FIG. 5, the area of the first surface 230 and second surface 236 are substantially equal in size but could vary such that the second surface 236 would be about one-half or any other ratio in size with respect to each other. At this time it is believed that the first surface 230 should be selected to be larger than the second surface to aid in the attenuation of sounds. It will be appreciated the contact edge 224,224' continues to change as a result of wear but will always remain the initial contact point on the leading edge 214 of the friction material 222.

In order to substantiate the attenuation of noise through the use of double chamfers 220,220' on a friction material 222, various tests were performed to measure noise created during a brake application of a base line friction material. A first base line friction material was placed in a dynamometer to simulate performance in a brake system and, audible frequencies noise created during a brake application was measured and recorded, retained.

An acceptable noise test for drum brakes in a dynamometer includes an performance evaluation of a friction material resulting from a series of stops from a set speed at a fixed deceleration rate and temperature. The following specific simulated brake application were performed: Burnish stops (180 stops all from 40 mph at 10 ft/sec$^2$ and 200° F.); First Noise Evaluation Matrix stops (132 total stops all from 25 mph with 33 stops at 75 psi, 33 stops at 150 psi, 33 stops at 300 psi and 33 stops at 400 psi, and temperature variances of 50° F. from 150° F. to 400° F., respectively); First city traffic simulation stops (50 snubs 30–15 mph at 6 ft/sec$^2$ at 250° F.; 50 snubs 30–15 mph at 6 ft/sec$^2$ at 300° F.; 25 snubs 30–15 mph at 6 ft/sec$^2$ at 400° F.; 50 stops 40–1 at 6 ft/sec$^2$ at 250° F.; 25 stops 40–1 mph at 6 ft/sec$^2$ at 400° F.; 25 stops 40–1 mph at 6 ft/ sec$^2$ at 450° F.); and 50 stops 40–1 mph at 6 ft/sec$^2$ at 300° F.; Second Noise Evaluation Matrix stops (Repeat to same sequence of the First Noise Evaluation Matrix); Second city traffic simulation stops (Repeat the sequence of the First city traffic simulation); and Third Noise Evaluation Matrix (Repeat the same sequence of the First Noise Evaluation Matrix).

The amplitude for noise was measured, recorded and stored in a computer during each brake application in this particular test sequence for the base line friction material. From an analysis and evaluation of the stored noise, it was determined that as long as the sound level is below 85 dB during any one stop in the series of stops, noise is not considered to be a problem. FIG. 7 is a block diagram of the test results for the first base line material.

Figure 8:
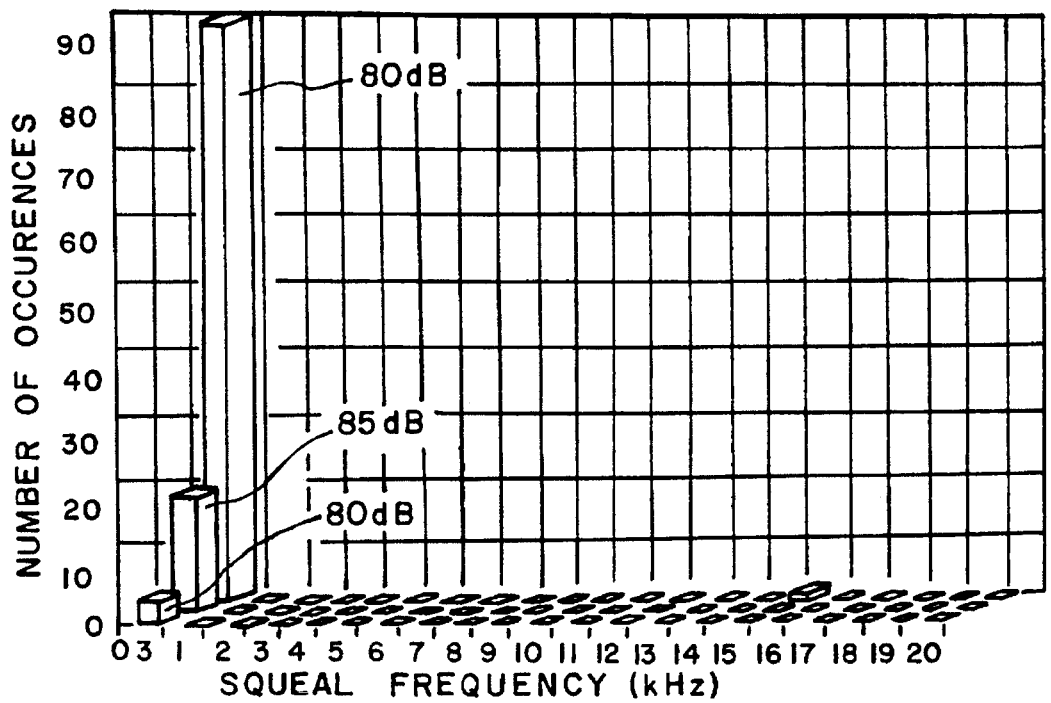
FIG. 8 is a table illustrating noise development through the engagement of a friction pad as illustrated in FIG. 5 with a drum brake.

Thereafter a friction pad 210 made from the first base line material with the double chamfers 220,220' on the leading edge 214 and trailing edge 216 was subjected to the same noise testing and evaluation as the base line friction material. FIG. 8 is a block diagram of the test results of friction pad 210. As can be seen, objectionable noise in the frequency range of 9–20 kHz has been substantially eliminated for this brake system. The low frequency noise indicated by this test was later identified as background noise and does not minimize the reduction in noise as result of the double chamfers 220,220'.

FIG. 9 illustrates another embodiment of a friction pad 300 for use in a drum brake system wherein the engagement surface 312 of a friction material 322 has been modified by double chamfers 320,320' located on both the leading 314 and trailing 316 edges of the friction material 322 and chamfers 321,321' on the peripheral surfaces 332 and 324. Contact edges 325,325' defined by the intersection of double chamfers 220,220' and chamfers 321,321' and engagement surface 312 to provide for initial engagement or contact point for surface 312 with a drum in a brake system such that frequency vibrations are modified or attenuated the an acceptable level.

The double chamfers 320,320' deviate from the engagement surface 312 at a downward angle φ of from 20°–45°, as shown in FIG. 10. Double chamfers 320 and 320' are located on the opposite ends of friction material 322, with the trailing edge chamfer 320' being about 45° and the leading edge chamfers 320 being about 30°. In addition, the chamfers 321,321' are about 45° but could range from 90° to 45° such that the engagement surface has a dome cross sectional shape. It is understood that each chamfer may differ in both size and the downward angle and in particular, the chamfer 320 associated with the leading edge 314 differs from the other chamfers only to provide a smoother entrance angle for initial engagement with the drum during a brake application.

Figure 11:
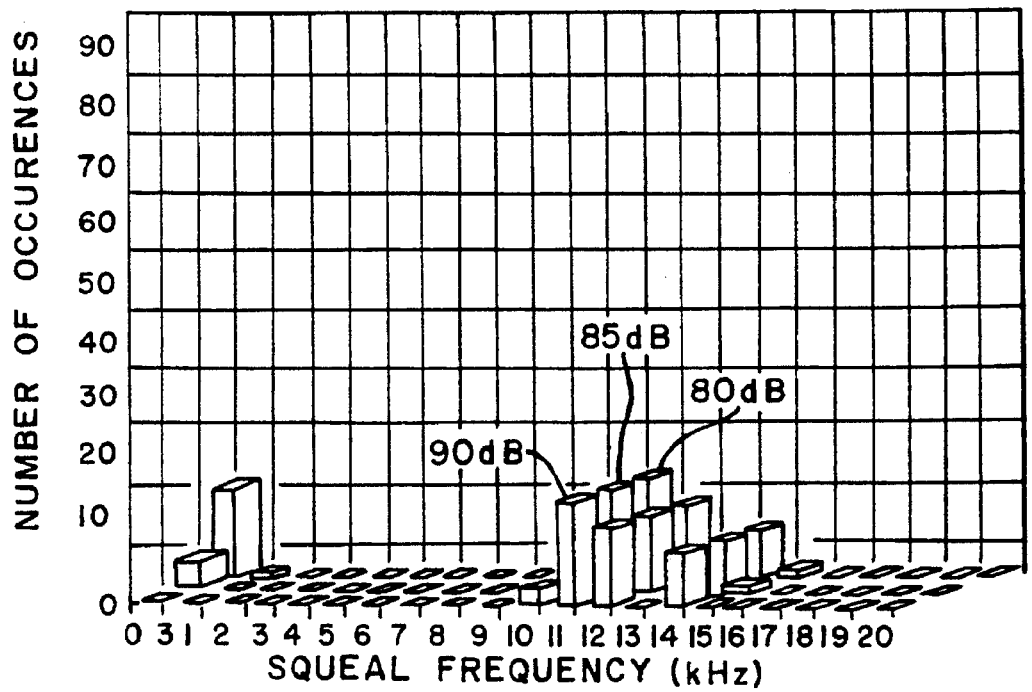
FIG. 11 is a table illustrating base line noise development through the engagement of a standard friction pad with a drum brake.

In order to substantiate the attenuation of noise through the use of double chamfers 320, 320', 321, and 321' on a friction material 322, various tests were performed to measure noise created during a brake application of a second base line friction material. A friction pad made from the second base line friction material was placed in a dynamometer and the same test identified above with respect to friction material 220 was made to simulate performance in a brake system. Through such testing, audible frequencies noise created during a brake application was measured, recorded and retained. FIG. 11 is a block diagram of the test results for the second base line and as shown objectionable noise occurred a range of 10 to 15 kHz.

Figure 12:
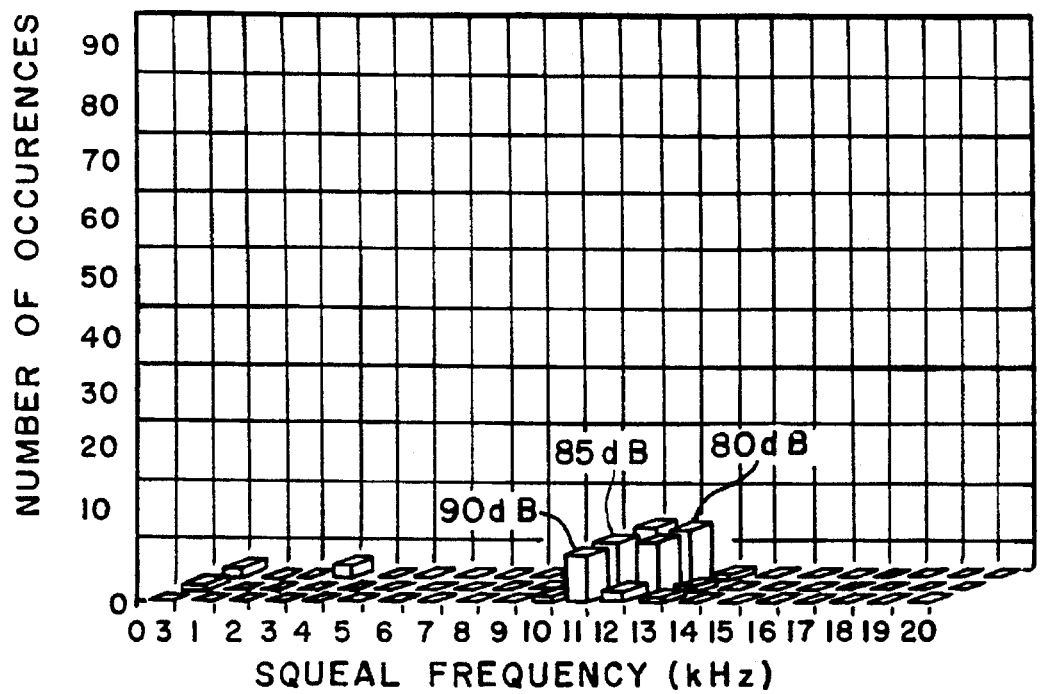
FIG. 12 is a table illustrating noise development through the engagement as a friction pad of illustrated in FIG. 9 with a drum brake.

Thereafter, friction pad 310 with the double chamfers 320,320' and chamfers 321 and 321 on the second friction material was subjected to the same noise testing as the second base line friction material. FIG. 12 is a block diagram of the test results of friction pad 322. Even though some high frequency noise still remains in the frequency range of 11–13 kHz it has been substantially reduced for this brake system.

I claim:

1. A brake pad having a friction member attached to a metal backing plate through a bond and engagable with a rotating member to effect a brake application, said friction member and rotating member generating a plurality of frequencies of audible sounds during such brake application, said friction member being characterized by double chamfers extending from an engagement surface toward a leading edge and a trailing edge, each of said double chamfers having a first surface that engages a second surface and said engagement surface to define a point that forms an initial contact with said rotating member and attenuates audible sounds generated during a brake application, said point of initial contact as said friction pad wears but continues to attenuate the generation of audible sounds in a same manner as prior to such wear.

2. The brake pad as recited in claim 1 wherein each of said double chamfers is further characterized by a first surface area in a first plane that deviates from said engagement surface by an angle of from 10°–20° and a second surface area in a second plane that deviates from said engagement surface by an angle of from 10°–20°, said first and second planes intersecting with said engagement surface to define said point of engagement.

3. The brake pad as recited in claim 2 wherein each of said double chamfers is further characterized in that said first surface area is substantially equal to said second surface area.

4. The brake pad as recited in claim 1 wherein each of said double chamfers is further characterized by a first surface area and a second surface area, said first surface area being substantially equal to said second surface area.

5. The brake pad as recited in claim 1 wherein each of said double chamfers is further characterized by a first surface area and a second surface area, said second surface area being approximately one-half the size of said first surface area.

6. A brake pad having a friction member attached to a metal backing plate through a bond and having an engagement surface which contacts a rotating member to effect a brake application, said friction member and rotating member generating a plurality of frequencies of audible sounds during such brake application, said friction member being characterized by double chamfers extending from said engagement surface toward a leading edge and a trailing edge, each of said double chamfers having a first surface that engages a second surface and said engagement surface to define a contact edge which forms an initial engagement contact with said rotating member and attenuates audible sounds generated during a brake application, said contact edge of engagement changes as said friction pad wears but continues to attenuate the generation of audible sounds in a same manner as prior to such wear.

7. The brake pad as recited in claim 6 wherein each of said double chamfers is further characterized by a first and second surface areas in a first and second planes that deviates from said engagement surface by an angle of from 30°–45°, said first and second planes intersecting with a third plane to define said contact edge.

8. The brake pad as recited in claim 7 wherein each of said double chamfers is further characterized in that said first surface area is substantially equal to said second surface area.

9. The brake pad as recited in claim 6 wherein each of said double chamfers is further characterized by a first surface area and a second surface area, said first surface area being substantially equal to said second surface area.

10. The brake pad as recited in claim 6 each of said double chamfers is further characterized by a first surface area and a second surface area, said second surface area being approximately one-half the size of said first surface area.

* * * * *